United States Patent [19]

Bostock et al.

[11] 4,153,413

[45] May 8, 1979

[54] COLORATION PROCESS

[75] Inventors: Susan M. Bostock; Violet Boyd; Brian R. Fishwick; Brian Glover; Stewart R. Korn, all of Blackley, England

[73] Assignee: Imperial Chemical Industries Limited, London, England

[21] Appl. No.: 862,300

[22] Filed: Dec. 19, 1977

[30] Foreign Application Priority Data

Jan. 14, 1977 [GB] United Kingdom ............... 1487/77

[51] Int. Cl.² .................. C09B 27/00; D06P 1/02
[52] U.S. Cl. ........................... 8/41 C; 8/1 D; 8/1 E; 8/21 C; 8/25; 8/26; 8/27; 8/41 R; 8/179
[58] Field of Search ............... 8/41 R, 41 C, 21 C, 8/26, 27, 1 D, 1 E, 25

[56] References Cited

U.S. PATENT DOCUMENTS

| | | | |
|---|---|---|---|
| 2,290,945 | 7/1942 | Dahlen et al. | 8/85 |
| 2,373,700 | 4/1945 | McNally et al. | 8/50 |
| 3,125,402 | 3/1964 | Kruckenberg et al. | 8/41 R |
| 3,580,902 | 5/1971 | Angliker | 8/27 |
| 3,993,438 | 11/1976 | Fishwick et al. | 8/21 C |
| 4,076,497 | 2/1978 | Freyberg et al. | 8/27 |

FOREIGN PATENT DOCUMENTS

| | | |
|---|---|---|
| 2231071 | 1/1974 | Fed. Rep. of Germany. |
| 2513949 | 10/1976 | Fed. Rep. of Germany. |
| 252384 | 8/1927 | United Kingdom ............ 8/27 |
| 1380845 | 1/1975 | United Kingdom. |
| 1495124 | 12/1977 | United Kingdom. |

*Primary Examiner*—A. Lionel Clingman
*Attorney, Agent, or Firm*—Cushman, Darby & Cushman

[57] ABSTRACT

Process for the continuous coloration of aromatic polyester or cellulose triacetate textile materials and of unions of aromatic polyester with cellulose, by applying to the textile material for the polyester or triacetate a disperse azo dyestuff containing a single carboxylic acid ester group and at least one group selected from primary, secondary or tertiary sulphamoyl or carbamoyl; imido (especially phthalimido), hydroxy, acyloxy, sulphone (especially alkylsulphonyl) and lactone groups, and for the cellulose component of a union a reactive or other dyestuff, followed by an alkaline rinse of the colored textile material.

10 Claims, No Drawings

COLORATION PROCESS

This invention relates to an improved process for the continuous colouration of aromatic polyester or cellulose triacetate textile materials and of unions of aromatic polyester with cellulose.

In known processes for colouring aromatic polyester or cellulose triacetate textile materials with disperse dyestuffs, an aqueous dispersion of one or more such dyestuffs is applied to the textile material by a dyeing, padding or printing process, the dyestuff being fixed by a simultaneous or subsequent heat treatment. In order that the resulting coloured textile material has the maximum fastness properties it is necessary that any unfixed dyestuff be removed from the surfaces of the fibres present in the textile material, and this is usually achieved by a "reduction clear" treatment (i.e. a treatment in a warm aqueous alkaline solution of sodium hydrosulphite). However the disposal of the liquors from the "reduction clear" treatment causes ecological problems due to the presence of the reducing agent.

It is also well known that aromatic polyester/cellulose unions can be coloured with mixtures of disperse and reactive dyestuffs, but the known processes suffer from the disadvantage that the disperse dyestuffs, in addition to colouring the aromatic polyester part of the union, also stain the cellulose part of the union. In order that the coloured union has the maximum fastness properties it is essential that this staining be removed, but in practice it is found difficult to remove the staining, for example by a "reduction-clear" or "oxidation-clear" treatment, without simultaneously destroying the reactive dyestuff which is attached to the cellulose part of the union. Further in the absence of such a treatment, any dyestuff which is removed by, for example, an ordinary washing treatment, can give rise, particularly in the case of prints, to back staining resulting in staining of other areas of the print, or dull tones. It has now been found that the above difficulties in respect of the continuous colouration of aromatic polyester, cellulose triacetate and aromatic polyester/cellulose unions can be overcome by using, as the disperse dyestuff, certain carboxylic ester group-containing disperse azo dyestuffs. Any staining of the cellulose caused by such dyestuffs can readily be removed by a simple alkaline treatment (i.e. which does not contain a reducing agent) which has no adverse effect on the reactive dyestuff used to dye the cellulose. In addition this treatment removes any unfixed disperse dyestuff from the polyester fibres, and there is little or no tendency for any of the disperse dyestuff so removed to back stain the union.

According to the present invention there is provided an improved process for the continuous colouration of aromatic polyester or cellulose triacetate textile materials which comprises continuously applying to the said textile materials by an aqueous padding or printing process and fixing by a heat treatment a disperse azo dyestuff, free from carboxylic acid and sulphonic acid groups, which is represented by the formula:

A—N=N—E wherein A is the residue of a diazotisable aromatic amine A-NH$_2$ and E is the residue of a coupling component which is an aromatic or heterocyclic amine, an aromatic hydroxy compound, a pyrazolone or an active aliphatic methylene compound, each dyestuff containing a single carboxylic ester group and at least one of the following:

(a) a primary, secondary or tertiary sulphamoyl group;
(b) a primary, secondary or tertiary carbamoyl group;
(c) an imido group; and in particular a phthalimido group;
(d) a hydroxy group;
(e) an acyloxy group;
(f) a sulphone group and in particular an alkylsulphonyl group;
(g) a lactone group;

and subsequently giving the coloured textile material a treatment in an aqueous alkaline bath at a pH above 8 and at a temperature between 50° and 85° C.

The process of the invention may be conveniently carried out by padding on to the synthetic textile material an aqueous dispersion of a disperse azo dyestuff as hereinbefore defined, the dyestuff then being fixed on the textile material by steaming it for short periods at a temperature between 100° and 180° C. or baking it at temperatures between 160° and 220° C. The aqueous dispersion of the azo dyestuff may be established, if desired, by dispersing agents, for example, non-ionic dispersing agents, cationic dispersing agents and anionic dispersing agents or a compatible mixture of two or more such dispersing agents. If desired the padding liquor can contain the conventional additives, for example, dispersing agents, thickeners, migration inhibitors or urea.

As an alternative method of application a thickened printing paste containing the disperse azo dyestuff in dispersed form can be applied to the surface of the synthetic textile materials by any of the methods conventionally used for applying printing pastes to synthetic textile materials, for example by block, screen or roller printing. The printed textile material, optionally after being dried, is then steamed for short periods at temperatures between 100° and 180° C., or is baked at temperatures between 160° and 220° C. Suitable thickening agents which are present in the printing paste include gum tragacanth, gum arabic, alginates, for example, sodium or ammonium alginates, oil-in-water or water-in-oil emulsions, or thickening agents of synthetic origin based on ethylene/maleic anhydride copolymers or polyacrylic acids. The printing pastes can also contain conventional additives such as urea, sodium m-nitrobenzene sulphonate, diimides, acids or alkalis to assist in bringing about fixation of the various dyestuffs.

After the padding or printing process has been carried out, the coloured textile material is then optionally rinsed in water and is then given a treatment in a hot aqueous alkaline solution having a pH of at least 8.0 and preferably having a pH of 10.0 to 11.5. The temperature of the said alkaline solution is preferably 60° to 80° C., higher temperatures generally being used at the lower pH's and vice-versa, and the time of treatment will vary on the depth of shade which has been applied to the union and the type of equipment which is being used; however the times are usually in the range of 30 seconds to 30 minutes. If desired the said alkaline solution can also contain a small amount (for example 0.2 to 1.0% by weight based on the weight of the solution) of a synthetic detergent. After the alkaline treatment the textile material is rinsed in water, optionally containing a synthetic detergent, and is then dried.

The said alkaline solutions are prepared from alkaline agents such as ammonia or ammonium salts or organic amines such as triethanolamine, but preferred alkaline agents are carbonates or hydroxides of alkali metals such as lithium, potassium and sodium.

Although the invention is described with reference to the use of a single disperse azo dyestuff, as hereinbefore defined, in many cases in order to obtain the required shades, it is necessary to use a mixture of the said disperse azo dyestuffs. Further, in order to obtain a wide variety of shades it is frequently necessary to apply the said disperse azo dyestuffs in conjunction with other disperse dyestuffs which can be applied by a similar process. Disperse dyestuffs which can be applied in a similar manner are those disperse dyestuffs, preferably of the aminoazobenzene series, which contain at least two carboxylic acid ester groups.

The disperse azo dyestuffs which are used in the process of the invention may be obtained by coupling a diazo component derived from an amine of the formula A—NH$_2$ with a coupling component, wherein A has the previously defined meanings, the amine and coupling component being free from sulphonic acid and carboxylic acid groups. The single carboxylic ester group and at least one other group as hereinbefore described which are essential features of the disperse azo dyestuffs used in the process of the invention may be present in the diazo component or the coupling component, or they may be distributed between the diazo component and coupling component.

As examples of the amines of the formula A—NH$_2$ there may be mentioned aniline, o-, m- or p-toluidine, o-, m- or p-anisidine, o-, m- or p-chloroaniline, o-, m- or p-bromoaniline, o-, m- or p-nitroaniline, 2:5-dichloroaniline, 2:4-dinitroaniline, 2:4-dinitro-6-(chloro or bromo)aniline, 4-methanesulphonylaniline, 4-aminobenzotrifluoride 4- or 5-nitro-2-toluidine, 4- or 5-nitro-2-anisidine, 4- or 5-chloro-2-anisidine, 4- or 6-chloro-2-toluidine, 4- or 5-bromo-2-anisidine, 2:6-di(-chloro- or bromo)-4-nitroaniline, 2:4:6-trinitroaniline, 2:4-dinitro-6-carbomethoxyaniline, 2-amino-5-nitrobenzotrifluoride, 2:4-bis(methanesulphonyl)aniline, 2-(chloro- or bromo-)-4-nitroaniline, ethyl or methylanthranilate, 4- or 5-nitromethyl or ethyl anthranilate, methyl or ethyl-m- or p-aminobenzoates, methyl or ethyl-3-(chloro-, bromo- or nitro-)-4-aminobenzoates, 4-aminobenzamide, 2:6-di(chloro- or bromo-)-aniline-4-sulphonamide, 2:6-di(chloro- or bromo-)-4-methylsulphonylaniline, 2:5-di(chloro- or bromo-)-4:6-dinitro-aniline, 2-amino-3:5-dinitrobenzotrifluoride, 3-amino-2-(chloro- or bromo-)-4:6-dinitro-(toluene or anisole), 3-amino-4-(chloro- or bromo-)-2:6-dinitro-(toluene or anisole), 2- or 4-cyanoaniline, 4-nitro-2-cyanoaniline, 2:4-dinitro-6-cyanoaniline, 2-nitro-4-cyanoaniline, 2-chloro-4-cyanoaniline, 3-amino-2:4:6-trinitrotoluene, 2-(chloro- or bromo-)-4-methylsulphonylaniline, 3-(chloro- or bromo-)-4-thiocyanatoaniline, 2-(chloro- or bromo-)-4-sulphamylaniline, 2-amino-5-nitrophenylmethylsulphone, 2-amino-3:5-dinitrophenylmethylsulphone, 2-amino-3-(chloro- or bromo-)-5-nitrophenylmethylsulphone, 2-sulphamyl-4-nitro-aniline, 2-methylsulphamyl-4-nitroaniline, 2-ethylsulphamyl-4-nitroaniline, butyl-sulphamyl-4-nitroaniline, 2-dimethylsulphamyl-4-nitroaniline, 2-methylsulphamyl-4:6-dinitroaniline, 2-methylsulphamyl-4-nitro-6-(chloro- or bromo-)-aniline, 2-butylsulphamyl-4-nitroaniline, methyl 2-amino-3-(chloro- or bromo-)-5-nitrobenzoate, aniline-2-, 3- or 4-sulphamate and aniline-2-, 3- or 4-N:N-dimethylsulphamate, 2,6-di(chloro or bromo)-4-methylaminosulphonylaniline, 4-diethylaminocarbonylaniline, 3-methylamino-sulphonylaniline, 2,4-di(chloro- or bromo)-6-methoxycarbonylaniline, 2,4-di(chloro or bromo)-6-methoxyaniline, 2,4-dinitro-6-dimethylaminocarbonylaniline, 1-naphthylamine, 1-amino-4-sulphamoylnaphthalene, 1-amino-4-methylsulphonylnaphthalene and 2-amino-6-methylaminosulphonylnaphthalene, 2,4-dicyanoaniline, 2,4,6-tricyanoaniline, 2,6-dicyano-3,5-dimethylaniline, 2,6-dicyano-4-methylaniline-4-aminoazobenzene and 4-methoxy-(or ethoxy-)carbonyl-4'-aminoazobenzene.

The coupling component may be any such component which is free from sulphonic acid and carboxylic acid groups provided that the azo dyestuff which results from its coupling with the diazonium salt derived from the amine A—NH$_2$ contains a single carboxylic ester group and at least one other group as hereinbefore described.

As specific examples of the coupling component there may be mentioned phenols such as phenol itself and o-, m- and p-cresol and 3-acetylaminophenol; naphthols such as 1- or 2-naphthol, 6-bromo-2-naphthol, 4-methoxy-1-naphthol and 2-naphthol-6-sulphonamide; acylacetoarylamides such as acetoacetanilide, acetoacet-2-chloroanilide and acetoacet-2-, 3- or 4-(methyl or methoxy)anilide; 5-aminopyrazoles such as 1-phenyl-3-methyl-5-aminopyrazole; 5-pyrazolones such as 1,3-dimethyl-5-pyrazolone, 1-phenyl-3-(carboalkoxy, carbonamido- or methyl)-5-pyrazolone and 1-[2'-, 3'- or 4'-(nitro, amino, chloro bromo, methyl or methoxy)-phenyl]-3-methyl-5-pyrazolone; primary, secondary or tertiary amines of the aromatic series such as 1-naphthylamine and N-(β-hydroxyethyl)-1-naphthylamine, and more particularly amines of the formula:

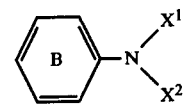

wherein the benzene ring B can contain substituents and $X^1$ and $X^2$ each independently represent hydrogen or optionally substituted lower alkyl radicals. As specific examples of such coupling components there may be mentioned:

methyl-3-(diethylamino)benzoate
N,N-dimethylaniline,
N,N-diethylaniline,
N-(γ-methoxypropyl)-3-acetylaminoaniline,
N,N-dihydroxyethyl-m-chloroaniline,
diphenylamine,
N-ethyl-N-(β-cyanoethyl)-m-toluidine,
N-ethyl-N-(β-cyanoethyl)aniline,
N-butyl-N-(β-cyanoethyl)-m-toluidine
N-ethyl-N-(β-hydroxyethyl)aniline or m-toluidine,
N-ethyl-N-(β-acetoxyethyl)aniline,
N,N-di(β-acetoxyethyl)-m-toluidine,
N,N-di-(β-acetoxyethyl)aniline,
2-methoxy-5-acetylamino-N-[β-(β'-methoxyethoxycarbonyl)ethyl]aniline,
N,N-diethyl-m-aminoacetanilide,
N-(β-cyanoethyl)-N-[β-(β'-methoxyethoxycarbonyl)ethyl]-3-acetylaminoaniline,
N-β-cyanoethyl-N-β'-methoxycarbonylethylaniline or m-toluidine,
N-N-diethyl-3-dimethylaminosulphonylaniline, N-β-cyanoethyl-N-β-acetoxyethylaniline or m-toluidine,
N-N-diethyl-3-methylaminosulphonylaniline,
2-methoxy-5-acetylamino-N,N-bis(β-acetoxyethyl)aniline,
N-(β-methoxycarbonyl)ethyl-2,5-dimethoxyaniline,
N:N-bis(β-acetoxyethyl)-m-aminoacetanilide,
N-ethyl-N-β-phthalimidoethylaniline,
N-β-hydroxyethyl-o-chloroaniline,
N-β-cyanoethyl-N-β-hydroxyethylaniline or m-toluidine,
N:N-di-(β-cyanoethyl)aniline or m-toluidine, The coupling component may alternatively be a coupling component containing a water-solubilising group such as a sulphonic acid group provided that this group is lost during the coupling procedure or may be readily removed after the coupling procedure to afford an azo dyestuff free from a water-solubilising group. As examples of such coupling components there are mentioned the N-methyl-ω-sulphonic acid derivatives of aniline, N-monoalkyl anilines and simple derivatives of these in which the function of the N-methyl-ω-sulphonic acid group is to direct the coupling into the nucleus to give azo compounds rather than azoamino compounds derived from attack at the nitrogen atom. Where such coupling components are used the azo dyestuffs formed in the coupling reaction are heated with aqueous alkali to remove the sulphonic acid group.

Preferred classes of azo dyestuffs for use in the process of the present invention are those which contain, in addition to the single carboxylic ester group, a sulphamoyl group, preferably a secondary sulphamoyl group; a carbamoyl group, preferably a tertiary carbamoyl group; an imido group, preferably a phthalimide group; a cyano group and a sulphamoyl group or a cyano group and a hydroxyl group.

The process of the present invention can also be applied to the continuous colouration of unions containing aromatic polyester fibres and cellulose fibres, the disperse azo dyestuff, as hereinbefore defined, being applied in conjunction with a suitable non-reactive colouring matter for the cellulose fibres.

According to a further feature of the present invention there is provided an improved process for the continuous colouration of aromatic polyester/cellulose unions which comprises continuously applying to the said unions a non-reactive dyestuff or pigment and a disperse azo dyestuff as hereinbefore defined, fixing the dyestuffs on the union and thereafter subjecting the coloured union to a treatment in an aqueous alkaline bath at a pH above 8.0 and at a temperature between 50° and 85° C.

This further process of the invention can be carried out by the methods known to be used for continuously applying mixtures of non-reactive dyestuffs or pigments and disperse dyestuffs to aromatic polyester/cellulose unions. The only difference between the present process and the known processes residing in the treatment of the union in the said aqueous alkaline bath, in order to remove any unfixed disperse dyestuff. The said treatment is preferably carried out after both types of dyestuff have been fixed on the union, but in those cases where the two types of colouring matter are applied separately and the disperse dyestuff is fixed before the application of the dyestuff (or pigment) for the cellulose fibres, then the said treatment in the aqueous alkaline bath can, if desired, be carried out immediately after the disperse dyestuff has been fixed on the aromatic polyester fibres.

As examples of classes of non-reactive dyestuffs or pigments which can be used to colour the cellulose fibres present in the unions there may be mentioned Direct dyestuffs, Vat dyestuffs, Sulphur dyestuffs, Pigment and Azoic colouring matters (these being based on a mixture of an azoic diazo component and an azoic coupling component so that an azo dyestuff is produced in situ); dyestuffs or pigments falling within the above classes being described in, for example, the third edition of the Colour Index which was published in 1971.

The said disperse dyestuff and the non-reactive dyestuff or pigment can be applied in separate steps in either order, or can when appropriate be applied together.

Although the invention is described with reference to the use of a disperse dyestuff or pigment, in many cases, in order to obtain the required shades, it is necessary to use a mixture of the said disperse dyestuffs and/or a mixture of the non-reactive dyestuffs or pigments, and the use of such mixtures is within the scope of the invention. Preferably the disperse dyestuff, or mixtures thereof, and the non-reactive dyestuff or pigment, or mixtures thereof, are so chosen that the polyester fibres and the cellulose fibres present in the union are coloured to substantially the same shade.

Methods of carrying out the further process of the invention are described under the following heads which relate to the class of dyestuff used for colouring the cellulose fibres present in the union.

1. Direct Dyestuffs

This can be conveniently carried out by, for example, padding or printing the aromatic polyester/cellulose union with a padding liquor or print paste containing the said disperse dyestuff, drying the union and then subjecting it to a heat or steaming treatment in order to fix the disperse dyestuff. At this stage the union is rinsed in water and is then given a washing treatment in the said aqueous alkaline bath in order to remove any unfixed disperse dyestuff after which it is rinsed in water and dried. The union is then padded or printed with a padding liquor or print paste containing the Direct dyestuff, and the Direct dyestuff is then fixed on the cellulose fibres present in the union in conventional manner.

Alternatively the aromatic polyester/cellulose union can be padded or printed with a padding liquor or print paste containing the two types of dyestuff, the union is dried and is then subjected to the action of heat or steam in order to simultaneously fix the dyestuffs. The union is then given a treatment in the said aqueous alkaline bath, is rinsed in water, and is finally dried.

2. Vat Dyestuffs

This can be conveniently carried out by, for example, padding or printing the aromatic polyester/cellulose union with a padding liquor or print paste containing the said disperse dyestuff and the Vat dyestuff, the union is dried and is then subjected to a heat or steaming treatment. The union is then treated with an aqueous solution of a reducing agent to reduce the Vat dyestuff to the leuco form and this is then fixed on the cellulose fibres present in the union by a steaming operation. Oxidation is then carried out in air or in an aqueous solution of an oxidising agent to convert the leuco dyestuff back to the Vat dyestuff, and the union is then given a treatment in the aqueous alkaline bath.

Alternatively the two types of dyestuff can be separately applied to the aromatic polyester/cellulose union.

Alternatively the vat dyestuff can be used in a solubilised form, and after it has been applied to the union it is developed by treatment in an aqueous solution of sodium nitrite and sulphuric acid.

3. Sulphur Dyestuffs

This can be conveniently carried out by, for example, padding or printing the aromatic polyester/cellulose union with a padding liquor or print paste containing the said disperse dyestuff, the union is dried and then subjected to the action of heat or steam. The union is then padded or printed with a padding liquor or print paste containing the Sulphur dyestuff and a reducing agent and the Sulphur dyestuff fixed by the action of steam. The union is then given a treatment in an oxidising bath and is then given a treatment in the aqueous alkaline bath.

Alternatively the dyestuffs can be applied together.

4. Azoic Colouring Matters

This can be be conveniently carried out by, for example, padding or printing the aromatic polyester/cellulose union with a padding liquor or print paste containing the said disperse dyestuff, the union is dried and is then subjected to the action of heat or steam. The union is then padded or printed with a padding liquor or print paste containing an azoic coupling component and an alkali, and the union is then treated with a solution of a diazo compound which is preferably a stabilised diazo compound. After coupling has taken place, the union is rinsed in a dilute aqueous solution of an acid, then in water, and is then given a treatment in the aqueous alkaline bath.

Alternatively the process can be carried out by the following methods:

(a) The union is padded or printed with a padding liquor or print paste containing an azoic coupling component, and is optionally dried. The union is then padded or printed with a padding liquor or print paste containing a diazo compound, preferably in a stabilised form, and the said disperse dyestuff. The union is optionally dried, and is then subjected to the action of heat or steam. The union is then treated in an aqueous solution of an acid, is rinsed in water and is then given the treatment in the aqueous alkaline solution, after which it is rinsed in water and dried.

(b) As in (a) except that the azoic coupling component and the mixture of the diazo compound and the disperse dyestuff are applied in the reverse order.

(c) The three components are applied together and after the dyestuffs have been developed and fixed on the union, the union is treated in the aqueous alkaline solution.

5. Pigments

This can be conveniently carried out by, for example, padding or printing the aromatic polyester/cellulose union with a padding liquor or print paste containing the said disperse dyestuff, a pigment and a binder, the union is dried and is then subjected to the action of heat or steam. The union is then given a treatment in the aqueous alkaline bath.

Alternatively the disperse dyestuff and the pigment can be separately applied to the union and the treatment in the aqueous alkaline bath either given after both colouring matters have been fixed on the union or immediately after the disperse dyestuff has been fixed on the union.

In the further process of the invention the treatment of the coloured aromatic polyester/cellulose union in the aqueous alkaline bath is carried out as hereinbefore described for the treatment of aromatic polyester or cellulose triacetate textile materials which have been coloured with the disperse azo dyestuff as the sole colouring matter.

In those cases where the non-reactive dyestuff is fixed by an alkaline treatment, and this takes place after the fixation of the disperse dyestuff, then the subsequent removal of the alkali used in this treatment by rinsing in water results in the formation of an aqueous alkaline solution which may simultaneously remove any unfixed disperse dyestuff. When the unfixed disperse dyestuff is removed in this manner then it is not necessary to subject the union to a further treatment in an aqueous alkaline solution.

The padding liquors or print pastes used to apply the said disperse dyestuffs and/or the non-reactive dyestuffs or pigments can contain any of the adjuvants which are conventionally employed in such liquors or pastes, for example thickening agents, migration inhibitors, cationic, anionic or non-ionic dispersing agents, urea, humectants, solubilising agents, bacteriocides, sequestering agents, wetting agents, emulsifiers, oxidising agents such as sodium chlorate or sodium-m-nitrobenzene sulphonate, fixation accelerators such as diphenyl and derivatives thereof, or polyethylene oxide adducts known as carriers or fixation accelerators, or antifoam agents such as organic derivatives of silicon.

The heat treatment used to fix the dyestuffs in the process of the invention can comprise a baking treatment in hot air at temperatures in the region of 150° to 230° C. or can be carried out by passing the union over a heated surface, for example over a calendar at 150° to 230° C. The steaming treatment can be carried out using superheated steam at temperatures up to 200° C., or using saturated steam at either atmospheric pressure or under pressure.

The aromatic polyester/cellulose unions used in the process of the invention can be any textile materials which are mixtures of aromatic polyester fibres and cellulose fibres. Such unions are usually in the form of knitted, or preferably woven goods. The percentage of aromatic polyester fibres is usually in the range of 20 to 95%, and preferably 30 to 85%, by weight of the weight of the union. The aromatic polyester fibres are preferably polyethylene terephthalate fibres, and the cellulose fibres are preferably cotton, linen, voscoaw rayon or polynosic rayon fibres.

Instead of a non-reactive dyestuff or pigment being used for the colouration of the cellulose part of an aromatic polyester/cellulose union, the cellulose may be coloured by means of a reactive dyestuff.

According to a yet further feature of the present invention there is provided an improved process for the continuous colouration of aromatic polyester/cellulose unions which comprises continuously applying to the said unions a reactive dyestuff and a disperse azo dyestuff as hereinbefore defined, fixing the dyestuffs on the union, and thereafter subjecting the coloured union to a treatment in an aqueous alkaline bath at a pH above 8.0 and at a temperature between 50° and 85° C.

The said disperse dyestuff and the reactive dyestuff can be applied in separate steps in either order but are preferably applied together.

Thus the process of the invention can be conveniently carried out by continuously padding or printing the union with a padding liquor or print paste containing the said disperse dyestuff, the reactive dyestuff and an alkaline agent. The padded or printed union is then preferably dried and is then subjected to a heat treatment to fix the dyestuffs on the union. This heat treatment can, for example, comprise treatment with superheated steam or in steam either at atmospheric pressure or under pressure, or a baking treatment in hot air at temperatures in the region of 150° to 230° C., or by passing the union over a heated surface, for example over a calendar at 150° to 230° C. At the conclusion of the heat treatment the union is optionally rinsed in water and is then given a treatment in a hot aqueous alkaline solution under the conditions hereinbefore described for the treatment of aromatic polyester or cellulose triacetate textile materials which have been coloured with the disperse azo dyestuff as the sole colouring matter.

The padding liquor or print paste may contain any of the adjuvants which are conventionally employed in such liquors or pastes, for example, those adjuvants which have been mentioned previously. In the present instance where disperse dyes and reactive dyes are being applied to an aromatic polyester/cellulose union the padding liquors or print pastes can be slightly acidic or neutral but are preferably slightly alkaline which can be achieved by incorporating therein a small amount, up to 2% by weight, of an alkaline agent such as sodium bicarbonate or sodium carbonate. Alternatively the print pastes or padding liquors can contain a substance, such as sodium trichloroacetate, which on heating or steaming liberates an alkaline agent.

When the said padding liquors or print pastes are slightly acidic or neutral then it is usually necessary to subsequently treat the padded or printed union with an alkali in order to obtain satisfactory fixation of the reactive dyestuff. This treatment with an alkali can be carried out before, but is preferably carried out after the fixation of the disperse dyestuff. However in the case of certain classes of reactive dyestuffs, for example those containing a 4-chloro-6-hydroxy-1:3:5-triazin-2-ylamino group, fixation of such dyestuffs following application from neutral or acidic medium can be effected by a heat treatment without the use of alkali.

When the dyestuffs are separately applied then the process of the invention can, for example, be conveniently carried out by padding or printing the said union with a padding liquor or print paste containing the disperse dyestuff, drying, heating or steaming the union to effect fixation of the disperse dyestuff, padding or printing the union with a padding liquor or print paste containing a reactive dyestuff and an alkali, fixing the reactive dyestuff by heating or steaming or, in the case of highly reactive dyestuffs, batching the union in a moist state. The union is then, optionally after rinsing in water, given a treatment in a hot aqueous solution of an alkaline agent at a pH above 8.0. If desired in this method of carrying out the process of the invention the dyestuffs can be applied in the reverse order.

When the reactive dyestuff is fixed by an alkaline shock treatment involving the use of a high concentration of an alkali as the last stage in applying both dyestuffs to the union, then when the union is subsequently given a rinse in water to remove the excess alkali the resulting alkaline solution can itself act as the aqueous alkaline bath, as hereinbefore defined, so that a separate treatment in such a bath may not be necessary.

Although the invention is described with reference to the padding liquor or print paste containing a disperse dyestuff and a reactive dyestuff, in many cases, in order to obtain the required shades, it is necessary to use a mixture of the said disperse dyestuffs and/or a mixture of the reactive dyestuffs, and the use of such mixtures is within the scope of the invention. Preferably the disperse dyestuff, or mixture thereof, and the reactive dyestuff, or mixture thereof, are so chosen that the polyester fibres and the cellulose fibres present in the union are coloured to substantially the same shade.

The reactive dyestuffs used in the process of the invention can be any water-soluble dyestuffs which contain at least one fibre-reactive group, this being defined as a group whose presence in the dyestuff molecule renders the dyestuff capable of chemically combining with hydroxy groups present in cellulose textile materials so that the dyestuff molecule becomes attached to the cellulose molecule through a covalent chemical bond or bonds. Each fibre-reactive group is attached to a carbon atom present in the dyestuff molecule and preferably to a carbon atom of an aromatic ring, preferably a benzene ring, present in the dyestuff molecule. The said dyestuffs are preferably dyestuffs of the azo, including monoazo and polyazo and metallised azo dyes, anthraquinone, formazan, triphendioxazine, nitro and phthalocyanine series containing at least one fibre-reactive group.

As examples of fibre-reactive groups there may be mentioned acylamino radicals derived from olefinically unsaturated aliphatic carboxylic acids such as acryloylamino and crotonylamino, or from halogen-substituted aliphatic carboxylic acids such as β-chloropropionylamino, β-bromopropionylamino, β:γ:γ-trichlorocrotonylamino and tetrafluorocyclobutylacryloylamino. Alternatively the fibre-reactive group can be a vinyl sulphone, β-chloroethyl sulphone, β-sulphatoethylsulphonyl, β-chloroethylsulphonamide or an optionally N-substituted β-aminoethylsulphonyl group.

The fibre-reactive group is preferably a heterocyclic radical having two or three nitrogen atoms in the heterocyclic ring and at least one labile substituent attached to a carbon atom of the heterocyclic ring. As examples of labile substituents there may be mentioned chlorine, bromine, fluorine, quaternary ammonium groups, thiocyano, sulphonic acid, hydrocarbylsulphonyl groups, groups of the formula

wherein the nitrogen atom carries optionally substituted hydrocarbon or heterocyclic radicals, and groups of the formula:

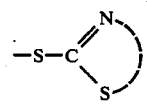

wherein the dotted line indicates the atoms necessary to form an optionally substituted or fused heterocyclic ring.

As specific examples of such fibre-reactive heterocyclic radicals there may be mentioned 3:6-dichloropyridazine-4-carbonylamino, 2:3-dichloroquinoxaline-5- or 6-(sulphonyl or carbonyl- )amino, 2:4-dichloroquinazoline-6- or 7-sulphonylamino, 2:4:6-trichloroquinazoline-7-or 8-sulphonylamino, 2:4:7- or 2:4:8-trichloroquinazoline-6-sulphonylamino, 2:4-dichloroquinazoline-6-carbonylamino, 1:4-dichlorophthalazine-6-carbonylamino, 4:5-dichloropyridazon-1-ylamino, 2:4-dichloropyrimid-5-yl-carbonylamino, 1-(phenyl-4'-carbonylamino)-4:5-dichloropyridazone, 2:4- and/or 2:6-dichloro- or bromo-pyrid-6-(and/or -4)ylamino, difluorochloropyrimidylamino, trichloropyrimidylamino, tribromopyrimidylamino, dichloro-5-(cyano, nitro, methyl or carbomethoxy)pyrimidylamino, 2-methylsulphonyl-6-chloropyrimid-4-ylcarbonylamino and 5-chloro-6-methyl-2-methylsulphonylpyrimid-4-ylamino, and more particularly 1:3:5-triazin-2-ylamino radicals which contain a fluorine or a bromine and, above all, a chlorine atom on at least one of the 4- and 6- positions, for example 4:6-dichloro-1:3:5-triazin-2-ylamino. When the triazine nucleus contains only a single halogen atom, preferably a chlorine atom, then the third carbon atom of the triazine ring can be substituted by a hydrocarbon radical, such as methyl or phenyl, but more particularly by an optionally substituted hydroxy, mercapto or amino group, such as methoxy, phenoxy, α- and β-naphthoxy, methylmercapto, phenylthio, methylamino, diethylamino, cyclohexylamino and anilino and N-alkylanilino and substituted derivatives thereof such as anisidino, toluidino, carboxyanilino, sulphoanilino, disulphoanilino and sulphonated naphthylamino.

Thus a preferred class of the reactive dyestuffs comprises those dyestuffs which contain as the fibre-reactive group a group of the formula:

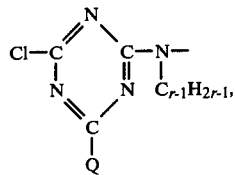

wherein r is 1 or 2, and Q is a chlorine atom, an optionally substituted amino group or an etherified hydroxyl group.

The optionally substituted amino groups represented by Q are preferably optionally substituted alkylamino, anilino, or N-alkylanilino groups, e.g. methylamino, ethylamino, β-hydroxyethylamino, di(β-hydroxyethyl)amino, β-methoxyethylamino, β-sulphatoethylamino, o-, m- and p-sulphoanilino, 4- and 5-sulpho-2-carboxyanilino, 4- and 5-sulpho-2-methoxyanilino, 4- and 5-sulpho-2-methylanilino, 4- and 5-sulpho-2-chloroanilino, 4- and 5-sulpho-2-chloroanilino, 2,4-, 2,5- and 3,5-disulphoanilino, N-methyl-m- and p-sulphoanilino.

If desired the fibre-reactive group can be of the type:

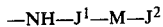

wherein $J^1$ is a pyrimidine or triazine ring optionally carrying a labile substituent, $J^2$ is a pyrimidine or triazine ring carrying at least one labile substituent and M is a bridging member which is linked to $J^1$ and $J^2$ through optionally substituted imino groups, said imino groups being linked together through an alkylene or arylene radical such as ethylene, 1:4-phenylene or 2-sulpho-1:4-phenylene.

Other linking groups of particular interest represented by M are the divalent radicals of stilbene, diphenyl, diphenyloxide, diphenylamine, diphenylurea, diphenoxyethane and diphenylamino-s-triazine, which contain a sulphonic acid group in each benzene nucleus.

It is preferred that $J^1$ and $J^2$ should each represent a chloro-s-triazine group. Thus, a further class of reactive dyestuffs comprises those dyestuffs which contain as the fibre-reactive group a group of the formula:

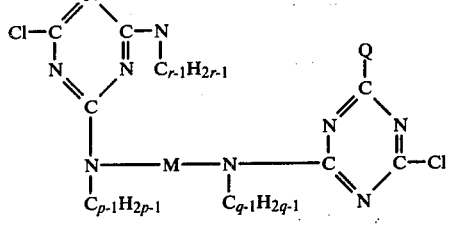

wherein r, p and q are each independently 1 or 2, and M and Q have the meanings stated above.

The group Q, as previously defined, includes within its scope groups which contain a chromophoric system linked to the carbon atom of the triazine ring through —NH— or —O—.

Such reactive dyestuffs can be obtained in conventional manner for example by reacting a water-soluble dyestuff containing a primary or secondary amino group with a compound which contains the said fibre-reactive group. As examples of such compounds there may be mentioned acryloyl chloride, cyanuric chloride, 2:4:6-trichloropyrimidine, 2:4:6-trichloro-5-(cyano- or chloro-)pyrimidine and 6-methoxy-2:4-dichloro-1:3:5-triazine.

Other preferred reactive dyestuffs are those containing one or more phosphorus acid groups, particularly phosphonic acid groups, which are applied to cellulose textile materials by the methods described in U.K. patent specification No. 1411306.

By the process of the invention aromatic polyester/cellulose anions are coloured in a variety of shades which have excellent fastness to the tests commonly applied to such textile materials, and there is excellent reserve of the white imprinted portions of such textile materials.

The invention is illustrated but not limited by the following Examples in which parts and percentages are by weight.

EXAMPLE 1

A dispersion of 2 parts of 2-N,N-dimethylsulphamoyl-4-(N,N-diethyl)amino-2'-methoxycarbonyl-4',6'-dichloroazobenzene in 7 parts of water containing 1 part of the disodium salt of bis-(2-sulphonaphth-1-yl)methane is added to a mixture comprising

| | | |
|---|---|---|
| 10% aqueous solution of sodium alginate | 48.4 | parts |
| Aqueous emulsion of sulphonated sperm oil and pine oil | 2 | parts |
| Urea | 10 | parts |
| Sodium bicarbonate | 1 | parts |
| Sodium-m-nitrobenzenesulphonate | 1 | parts |
| Sodium hexametaphosphate | 0.6 | parts |
| Trisodium salt of 2-ureido-4-(4'-chloro-6'-amino-1',3',5'-triazin-2'-ylamino)-1-(3'',6'',8''-trisulphonaphth-2''-ylazo)benzene | 2.5 | parts | and the resulting print paste is printed on to a woven 67:33 "Terylene"/cotton textile material ("Terylene" is a Registered Trade Mark), and the textile material dried. The textile material is then steamed for 6 minutes at 170° C. at atmospheric pressure. The textile material is then rinsed in water, treated for 10 minutes at 85° C. in an aqueous solution containing 0.2% of sodium carbonate and 0.2% of non-ionic detergent at a liquor ratio of 50:1, rinsed again in water and finally dried.

The textile material is thereby printed in a golden yellow shade having excellent reserve on the white unprinted portions, and the print has excellent fastness to wet treatments.

In place of the 0.2% of sodium carbonate used in the washing liquor there is used 0.2% of sodium hydroxide when a similar result is obtained.

In place of the 1 part of sodium bicarbonate used in the above Example there are used 3 parts of sodium trichloroacetate when a similar result is obtained.

Instead of steaming the printed textile material for 6 minutes at 170° C., the printed textile material is baked for 1 minute at 200° C. when similar results are obtained.

EXAMPLE 2

A dispersion of 2 parts of 2-N,N-dimethylsulphamoyl-4-(N,N-diethyl)amino-2'-methoxycarbonyl-4',6-dichloroazobenzene in 7 parts of water containing 1 part of the disodium salt of bis-(2-sulphonaphth-1-yl)methane is added to a mixture comprising:

| | | |
|---|---|---|
| 10% aqueous solution of sodium alginate | 48.4 | parts |
| Aqueous emulsion of sulphonated sperm oil and pine oil | 2 | parts |
| Urea | 10 | parts |
| Sodium-m-nitrobenzenesulphonate | 1 | parts |
| Sodium hexametaphosphate | 0.6 | parts |
| Trisodium salt of 2-ureido-4-(4'-chloro-6'-amino-1',3',5'-triazin-2'-ylamino)-1-(3",6",8"-trisulphonaphth-2"-ylazo)benzene | 2.5 | parts |
| Water to | 100 | parts | and the resulting print paste is printed on to a woven 67:33 "Terylene"/cotton textile material, and the textile material dried. The textile material is then baked for 1 minute at 200° C. The printed textile material is then immersed for 10 seconds in an aqueous solution at 98° C. containing 1.9% of sodium hydroxide, 15% of sodium carbonate, 5% of potassium carbonate and 10% of sodium chloride. The print is then rinsed in water, treated for 10 minutes at 85° C. in an aqueous solution containing 0.2% of sodium hydroxide and 0.2% of a non-ionic detergent (L.R. 50:1), rinsed again in water and finally dried.

The resulting golden yellow print is of solid shade and excellent fastness properties, and there is also excellent reserve of the white unprinted portions.

In place of the "Terylene"/cotton textile material used in this Example there is used a 67:33 polyethylene terephthalate/viscose rayon textile material when a similar result is obtained.

EXAMPLE 3

In place of the "Terylene"/cotton textile material used in Example 1 there is used a 67:33 polyethylene terephthalate/polynosic viscose ("Vincel"-a Registered Trade Mark) textile material when a similar result is obtained.

EXAMPLE 4

In place of the disperse dyestuff used in Example 1 there are used 2 parts of 2-acetylamino-4-[N-(β-cyanoethyl)-N-β-(β'-methoxyethoxycarbonyl)ethyl]amino-4'-N,N-diethylcarbamoylazobenzene when a golden yellow shade is obtained.

EXAMPLE 5

In place of the disperse dyestuff used in Example 1 there are used 2 parts of 2-N-methylsulphamoyl-4-(N,N-diethyl)amino-2'-methoxycarbonyl-4'-nitroazobenzene and in place of the reactive dyestuff used in Example 1 there are used 2 parts of 7-(4'-methoxy-2'-sulphophenylazo)-2-N-(2",4"-dichloro-1",3",5"-triazin-6-yl)-N-methylamino-8-naphthol-6-sulphonic acid when a red print is obtained having excellent reserve of the white unprinted areas.

EXAMPLE 6

The print paste described in Example 1 is printed on to a woven 67:33 "Terylene"/cotton textile material, and the textile material dried. The textile material is placed between two pieces of porous paper and the resulting sandwich passed continuously through a transfer printing calender (comprising a rotatable heated metal cylinder against which the sandwich is firmly held in contact by a support blanket), the temperature of the cylinder being 210° C. and the time of contact of the sandwich with the surface of the cylinder being 30 seconds.

The textile material is then rinsed in water, treated for 10 minutes in an aqueous solution at 85° C. containing 0.2% of sodium carbonate and 0.2% of a non-ionic detergent at a liquor to goods ratio of 50:1, rinsed again in water, and finally dried.

The textile material is thereby printed in a golden yellow shade having excellent reserve on the white unprinted portions, and the print has excellent fastness to wet treatments.

In place of the 0.2% of sodium carbonate used in the above washing liquor there is used 0.2% of sodium hydroxide or 0.2% of lithium hydroxide when a similar result is obtained.

In place of the 1 part of sodium bicarbonate used in the print paste there are used 3 parts of sodium trichloroacetate when a similar result is obtained.

EXAMPLE 7

In place of the "Terylene"/cotton union used in Example 1 there is used a woven 50:50 "Terylene"/cotton textile material when a similar result is obtained.

EXAMPLE 8

The process described in Example 2 is repeated except that after the baking treatment (1 minute at 200° C.) the printed textile material is padded with a 10% aqueous solution of sodium silicate and the material then batched (i.e. stored in a roll) in the wet state for 4 hours at 20° C. to effect fixation of the reactive dyestuff. The textile material is then rinsed in water and then given an alkaline rinse as described in Example 2. A similar print is obtained.

EXAMPLE 9

The process of Example 1 is repeated except that the treatment in the aqueous solution containing 0.2% of sodium carbonate and 0.2% of a non-ionic detergent is replaced by a treatment for 10 minutes in a 0.2% aqueous solution of sodium hydroxide at 80° C. A similar result is obtained.

EXAMPLE 10

A dispersion of 1 part of 2-N,N-dimethylsulphamoyl-4-(N,N-diethyl)amino-2'-methoxycarbonyl-4',6'-dichloroazobenzene containing 7 parts of water, 1 part of the disodium salt of bis-(2-sulphonaphth-1-yl)methane is added to a mixture of:

| | | |
|---|---|---|
| Sodium bicarbonate | 1 | part |
| Urea | 5 | part |
| 2% Aqueous solution of the sodium salt of partially hydrolysed polyacrylonitrile | 1 | part |
| Sodium salt of an isopropylnaphthalene sulphonic acid | 0.05 | part |
| Trisodium salt of 2-ureido-4-(4-'-chloro-6'-amino-1',3',5'-triazin-2'-ylamino)-1-(3",6",8"-trisulphonaphth-2"-ylazo)benzene | 2.5 | parts |
| Water to | 91 | parts |

The resulting liquor is continuously padded on to a woven 50:50 "Terylene"/cotton textile material, the textile material is dried and is then baked for 60 seconds at 220° C.

The textile material is then rinsed in water, treated for 5 minutes at 80° C. in an aqueous solution of 0.2% of sodium carbonate and 0.2% of a non-ionic detergent at a liquor to goods ratio of 50:1, rinsed again in water, and is finally dried.

The textile material is uniformly coloured a golden yellow shade having excellent fastness to wet treatments.

In place of the 1 part of sodium bicarbonate used in the above padding liquor there are used 3 parts of sodium trichloroacetate when a similar result is obtained.

EXAMPLE 11

A dispersion of 1 part of 2-N,N-dimethylsulphamoyl-4-(N,N-diethyl)amino-2'-methoxycarbonyl-4',6'-dichloroazobenzene in 7 parts of water containing 1 part of the disodium salt of bis-(2-sulphonaphth-1-yl)methane is added to a mixture of:

| | | |
|---|---|---|
| 2% Aqueous solution of the sodium salt of partially hydrolysed polyacrylonitrile | 1 | part |
| Trisodium salt of 2-ureido-4-(4'-chloro-6'-amino-1',3',5'-triazin-2'-ylamino)-1-(3",6",8"-trisulphonaphth-2"-ylazo)benzene | 2.5 | parts |
| Water | 91 | parts |

The resulting liquor is continuously padded on to a woven 50:50 "Terylene"/cotton textile material, the material dried and then baked for 60 seconds at 220° C. The material is then continuously padded with an aqueous solution of 1% sodium hydroxide and 20% of sodium chloride at 20° C., and the material is then passed through a steamer at 102° C., the time of contact being 40 seconds. The material is rinsed for 30 seconds in cold water, then for 30 seconds in water at 50° C., washed for 30 seconds at 80° C. in a 0.2% aqueous solution of sodium hydroxide (all these operations being carried out at a liquor to goods ratio of 100:1), rinsed again in water, and is finally dried.

The textile material is thereby uniformly coloured in a golden yellow shade possessing excellent fastness to wet treatments.

EXAMPLE 12

A liquor as in Example 11 is prepared and is continuously padded on to a woven 50:50 "Terylene"/viscose rayon material. The material is dried and is then baked for 1 minute at 220° C. The material is padded through an aqueous solution of 1% sodium hydroxide and 20% of sodium chloride at 20° C., and is then batched for 3 hours at 20° C. The material is then rinsed and washed as described in Example 11. A golden yellow colouration having excellent wet fastness properties is obtained.

Similar results are obtained when the textile material used in the above Example is replaced by a 67:33 polyethyleneterephthalate/polynosic viscose textile material or by a 50:50 polyethyleneterephthalate/linen textile material.

EXAMPLE 13

In place of the 0.2% aqueous solution of sodium hydroxide used for the washing treatment in Example 11 there is used a 0.2% aqueous solution of each of the following compounds when similar results are obtained:
 (a) lithium hydroxide
 (b) potassium hydroxide
 (c) potassium carbonate
 (d) trimethylphenylammonium hydroxide

EXAMPLE 14

In place of the disperse dyestuff used in Example 1 there are used 2 parts of 2-acetylamino-4-[N-$\beta$-cyanoethyl-N-$\beta$-($\beta'$-methoxyethoxycarbonyl)ethylamino]-4'N,N-dimethylcarbamoylazobenzene, when a similar golden yellow print is obtained.

EXAMPLE 15

In place of the disperse dyestuff used in Example 1 there are used 2 parts of 2-N-methylsulphamoyl-4-(N,N-diethyl)amino-2'-methoxycarbonyl-4',6'-dichloroazobenzene and in place of the reactive dyestuff used in Example 1 there are used 1.5 parts of 2-(1",5"-disulphonaphth-2"-ylazo)-1-hydroxy-3-sulpho-6-[N-methyl-N-(4'-amino-6'-chloro-1',3',5'-triazin-2'-yl)]aminonaphthalene when an orange print is obtained having excellent reserve of the white unprinted areas.

EXAMPLE 16

10 Parts of a 10% aqueous dispersion of 2-N-methylsulphamoyl-4-(N,N-diethyl)amino-2'-methoxycarbonyl-4'-nitroazobenzene are added to a mixture of 2 parts of an aqueous emulsion of sulphonated sperm oil and pine oil, 10 parts of urea, 1 part of sodium-m-nitrobenzenesulphonate, 0.6 parts of sodium hexametaphosphate, 48.4 parts of a 10% aqueous solution of sodium alginate and 28 parts of water, and the resulting print paste is printed on to a knitted aromatic polyester textile material. The printed material is dried and is then steamed for 6 minutes in superheated steam at 170° C. The material is then rinsed in water, treated for 5 minutes in a 0.2% aqueous solution of sodium hydroxide at 80° C. (the liquor to goods ratio being 50:1), rinsed again in water, and is finally dried.

A red print is obtained having excellent fastness to wet treatments and there is no staining of the unprinted areas.

Instead of steaming the printed material in order to fix the dyestuff, the printed material is baked for 1 minute at 200° C., A similar result is obtained.

EXAMPLE 17

In place of the 10 parts of 10% aqueous dyestuff dispersion used in Example 16 there are used 10 parts of 2-N,N-dimethylsulphamoyl-4-(N,N-diethyl)amino-2'- methoxycarbonyl-4',6'-dichloroazobenzene whereby a golden yellow print is obtained.

Similar results are obtained when the aromatic polyester textile material is replaced by a cellulose triacetate textile material.

EXAMPLE 18

A padding liquor comprising a mixture of 5 parts of a 10% aqueous dispersion of 2-N-methylsulphamoyl-4-(N,N-diethyl)amino-2'-methoxycarbonyl-4'-nitroazobenzene, 1 part of a 25% aqueous solution of the sodium salt of partially hydrolysed polyacrylonitrile and 94 parts of water is continuously padded on to a woven aromatic polyester textile material, and after drying the material is continuously passed through a baker operating at 220° C., the time of contact being 1 minute. The material is then rinsed in water, treated for 5 minutes at 80° C. in an aqueous solution containing 0.2% of sodium hydroxide and 0.2% of a non-ionic detergent, rinsed again in water and finally dried.

The textile material is coloured overall in a red shade possessing excellent fastness to wet treatments.

In place of the aromatic polyester textile material used in this Example there is used a woven 67:33 aromatic polyester/cellulose union whereby the aromatic polyester fibres are coloured a red shade and the cellulose fibres are uncoloured.

EXAMPLE 19

A dispersion of 15 parts of 2-acetylamino-4[N-(β-cyanoethyl)-N-β-(β'-methoxyethoxycarbonyl)ethyl-]amino-2',6'-dibromo-4'-N-methylsulphamoylazobenzene in a mixture of 5 parts of a sodium lignin sulphonate and 67.8 parts of water is added to a mixture of 5 parts of a 20% aqueous paste of C.I. Vat Brown 3 (C.I. 69015), 0.6 part of sodium hexametaphosphate, 40 parts of a 10% aqueous solution of a starch ether thickener, 25 parts of a 4% aqueous solution of sodium alginate and 29.4 parts of water. The resulting print paste is printed on to a woven 50:50 "Terylene"/cotton textile material ("Terylene" is a Registered Trade Mark) and the print is dried. The print is then passed through a baker operating at 200° C., the time of contact being 1 minute. The print is then padded through a mixture of 200 parts of an 8% aqueous solution of gum tragacanth, 25 parts of sodium carbonate, 75 parts of a 32% aqueous solution of sodium hydroxide, 50 parts of sodium hydrosulphite and 600 parts of water at 20° C., with a pick up of 70%. The print is then steamed for 20 seconds at 110° C., and is then thoroughly rinsed in cold water (during which stage oxidation of the vat dyestuff takes place). The print is then treated for 5 minutes in an aqueous solution at 85° C. containing 0.2% of sodium carbonate and 0.2% of a non-ionic detergent. The print is finally rinsed in water and dried.

A yellow-brown print is obtained having excellent wet fastness properties, and there is no staining of the unprinted areas.

A similar result is obtained when the washing liquor contains 0.2% of sodium hydroxide instead of the 0.2% of sodium carbonate.

EXAMPLE 20

10 parts of a 10% aqueous dispersion of 2-N,N-dimethylsulphamoyl-4-(N,N-diethyl)amino-2'-methoxycarbonyl-4',6',-dichloroazobenzene and 3 parts of a stabilised azoic combination comprising equimolecular proportions of:

(a) diazotised m-chloroaniline which is stabilised in the form of the triazine with 5-sulpho-2-ethylaminobenzoic acid, and (b) the o-phenetidide of 2-hydroxy-3-naphthoic acid, are mixed with 5 parts of β-ethoxyethanol, 5.5 parts of N:N-diethyl-N-β-hydroxyethylamine and 76.5 parts of water.

The resulting print paste is printed on to a 50:50 "Terylene"/cotton fabric, the print is dried, and is then steamed for 8 minutes with superheated steam at 165° C. The print is then treated for 5 minutes in an aqueous solution at 85° C. containing 0.2% of sodium hydroxide and 0.2% of a non-ionic detergent.

An orange print is obtained which possesses excellent wet fastness properties and there is no staining of the unprinted areas.

EXAMPLE 21

A padding liquor is prepared comprising a mixture of 50 parts of 10% aqueous dispersion of 2-N,N-dimethylsulphamoyl-4-(N,N-diethyl)amino-2'-methoxycarbonyl-4',6'-dichloroazobenzene, 3 parts of a liquid brand of C.I. Vat Orange 15 (C.I. 69025), 0.4 part of a liquid brand of C.I. Vat Red 10 (C.I. 67000), 1 part of an aqueous solution of partially hydrolysed polyacrylonitrile, 0.1 part of sodium dihydrogen phosphate and 45.5 parts of water.

A woven 67:33 polyester/mercerised cotton textile material is padded through the above liquor and subsequently mangled so as to give a 55% take-up of the liquor (based on the weight of the textile material). The material is dried and then baked for 1 minute at 220° C. The material is cooled, padded through an aqueous solution containing 5% of sodium hydroxide, 5% of sodium hydrosulphite and 0.2% of the sodium salt of a sulphonated oleic acid, and steamed for 30 seconds at 103° C. in the absence of air. The material is then rinsed in water, immersed for 5 minutes in a 0.2% aqueous solution of hydrogen peroxide at 50° C., rinsed in water, treated for 10 minutes in an aqueous solution at 80° C. containing 0.2% of sodium carbonate and 0.2% of a non-ionic detergent, rinsed again in water, and is finally dried. An orange dyeing of excellent wet fastness properties is obtained.

EXAMPLE 22

A padding liquor comprising 50 parts of a 10% aqueous dispersion of 2-N-methylsulphamoyl-4-(N,N-diethyl)amino-2'-methoxycarbonyl-4'-nitroazobenzene, 1 part of an aqueous solution of a partially hydrolysed polyacrylonitrile and 49 parts of water is padded on to a woven 50:50 aromatic polyester/cotton textile material to give a liquor pick-up of 55%. The material is dried and is then baked for 1 minute at 220° C. The material is then padded through a solution of 2 parts of the anilide of 2-hydroxy-3-naphthoic acid in a mixture of 10 parts of a 32% aqueous solution of sodium hydroxide, 0.15 part of a 40% aqueous solution of formaldehyde and 87.85 parts of water. The material is dried and then padded through an 8% aqueous solution of the zinc chloride/aluminium sulphate double salt of diazotised 3-nitro-4-methylaniline. The material is then rinsed in a 0.3% aqueous solution of hydrochloric acid, rinsed in water, treated for 5 minutes in an aqueous solution at 80° C. containing 0.1% of sodium carbonate and 0.2% of a non-ionic detergent, rinsed again in water, and finally dried.

A red colouration is obtained.

EXAMPLE 23

A padding liquor comprising 50 parts of a 10% aqueous dispersion of 2-N,N-dimethylsulphamoyl-4-(N,N-diethyl)amino-2'-methoxycarbonyl-4',6'-dichloroazobenzene, 1 part of an aqueous soluution of a hydrolysed polyacrylonitrile and 49 parts of water is padded on to a 67:33 woven aromatic polyester/cotton textile material so as to give a liquor take-up of 55% (based on the weight of the material). The material is dried and is then baked for 1 minute at 220° C. The material is then padded with a liquor at 80° C. comprising 3 parts of a liquid brand of C.I. Sulphur Black 2 (C.I. 53195), 0.2 part of the sodium salt of a sulphonated oleic acid, 1.5 parts of sodium sulphide, 1.5 parts of sodium carbonate and 93.8 parts of water, and the material is steamed for 1 minute at 103° C. The material is then rinsed in cold water, treated in a 0.3% aqueous solution of sodium perborate, rinsed in water, treated for 5 minutes in a 0.1% aqueous solution of sodium hydroxide at 80° C., rinsed again in water and finally dried. A two-tone golden yellow/black dyeing is obtained.

EXAMPLE 24

A padding liquor comprising 25 parts of a 10% aqueous dipsersion of 2-N-methylsulphamoyl-4-(N,N-diethyl)amino-2'-methoxycarbonyl-4'-nitroazobenzene, 1 part of a 10% aqueous solution of a partially hydrolysed polyacrylonitrile and 74 parts of water, is padded on to a woven 67:33 aromatic polyester/viscose textile material so as to give a liquor take-up of 60%. The material is dried and is then baked for 1 minute at 220° C. The material is rinsed in water, treated for 10 minutes in an aqueous solution at 85° C. of 0.2% sodium hydroxide and 0.2% of a non-ionic detergent, rinsed again in water and dried. The material is then padded through a 1% aqueous solution of C.I. Direct Red 24 (C.I. 29185) at 80° C., and the material is steamed for 3 minutes at 103° C. The material is then padded at 80° C. in a 2% aqueous solution of a dicyandiamide/phenol/formaldehyde/ammonium chloride condensate and the material is then heated for 5 minutes at 150° C.

A red dyeing is obtained.

EXAMPLE 25

A print paste is prepared comprising:

| | | |
|---|---|---|
| A mixture of a 10% aqueous dispersion of 2,5-dimethoxy-4-(N,β-methoxycarbonylethyl)amino-2'-N,N-dimethylcarbamoyl-4',6'-dinitroazobenzene | 10 | |
| Paste brand of C.I. pigment Blue 15 (C.I. 74160) | 3 | parts |
| 4% Aqueous solution of sodium alginate | 6 | parts |
| Butadiene/acrylonitrile copolymer | 20 | parts |
| Condensate of 24 mols of ethylene oxide with 1 mole of a cetyl/stearyl alcohol mixture | 1.5 | parts |
| Etherified hexamethylolmelamine/formaldehyde condensate | 2 | parts |
| White spirit | 50 | parts |
| Urea | 1.5 | parts |
| Water to | 100 | parts |

The print paste is applied to a woven 67:33 aromatic polyester/cotton textile material, the material is dried and is then subjected for 6 minutes to superheated steam at 170° C. The material is then treated for 5 minutes in an aqueous solution at 85° C. of 0.2% sodium hydroxide and 0.2% of a non-ionic detergent, rinsed in water, and finally dried. A blue print of good wet fastness properties is obtained and there is excellent reserve (i.e. no staining) of the unprinted areas.

EXAMPLES 26–49

The process described in Example 18 is repeated except that in place of the 5 parts of a 10% aqueous dispersion of 2-N-methylsulphamoyl-4-(N,N-diethyl)amino-2'-methoxycarbonyl-4'-nitroazobenzene there are used 5 parts of a 10% aqueous dispersion of one of the disperse dyestuffs listed in the second column of the following table, the shade obtained on woven aromatic polyester textile material being given in the third column:

| Example | Disperse Dyestuff | Shade |
|---|---|---|
| 26 | 4-N-Methylsulphamoyl-2'-acetylamino-4'-[N-ethyl-N-(β-methoxycarbonylethyl]aminoazobenzene | Orange |
| 27 | 4-N-Phenylsulphamoyl-2'-acetylamino-4'-[N-ethyl-N-(β-methoxycarbonylethyl)]aminoazobenzene | " |
| 28 | 4-Sulphamoyl-2'-acetylamino-4'-[N-ethyl-N-(β-methoxycarbonylethyl)]aminoazobenzene | " |
| 29 | 2-Chloro-4-N,N-dimethylsulphamoyl-2'-acetylamino-4'-[N-(β-cyanoethyl)-N-(β-methoxycarbonylethyl)]aminoazobenzene | " |
| 30 | 2-Methoxycarbonyl-4-nitro-4'-[N-ethyl-N-(β-ethylsulphonylamino)ethyl]aminoazobenzene | Red |
| 31 | 4-Methylsulphonyl-2'-acetylamino-4'-[N-ethyl-N-(β-methoxycarbonylethyl)]aminoazobenzene | Orange |
| 32 | 4-Ethylsulphonyl-2'-acetylamino-4'-[N-ethyl-N-(β-methoxycarbonylethyl)]aminoazobenzene | " |
| 33 | 2,6-Dichloro-4-methylsulphonyl-2'-acetylamino-4'-[N-(β-cyanoethyl)-N-(β-methoxycarbonylethyl)]aminoazobenzene | " |
| 34 | 4-(β-Cyanoethyl)sulphonyl-2'-acetylamino-4'-[N-ethyl-N-(β-methoxycarbonylethyl)]aminoazobenzene | Orange |
| 35 | 3,4-Dicarboximido-2'-acetylamino-4'-[N-(β-cyanoethyl)-N-β-(β'-methoxyethoxycarbonyl)ethyl]aminoazobenzene | " |
| 36 | 3,4-Dicarbox-N-methylimido-2'-acetylamino-4'-[N-(β-cyanoethyl)-N-β-(β'-methoxyethoxycarbonyl)ethyl]aminoazobenzene | " |
| 37 | 3,4-Dicarbox-N-ethylimido-2'-acetylamino-4'-[N-(β-cyanoethyl)-N-β-(β'methoxyethoxycarbonyl)ethyl]aminoazobenzene | " |
| 38 | 3,4-Dicarbox-N-(methoxycarbonylmethyl)imido-2'-acetylamino-4'-N,N-diethylaminoazobenzene | Red |
| 39 | 3,4-Dicarbox-N-(β-methoxyethoxycarbonylmethyl)imido 2'-acetylamino-4'-N,N-diethylaminoazobenzene | " |

| Example | Disperse Dyestuff | Shade |
|---|---|---|
| 40 | 2-Methoxycarbonyl-4-nitro-4'-[N-ethyl-N-(β-phthalimido-ethyl)]aminoazobenzene | Scarlet |
| 41 | 2-Methoxycarbonyl-4-nitro-2'-acetylamino-4'-[N,N-di(β-hydroxyethyl)]aminoazobenzene | Red |
| 42 | 4-Methoxycarbonyl-2'-acetylamino-4'-[N,N-di(β-acetoxyethyl)]aminoazobenzene | Orange |
| 43 | 3-N-Methylcarbamoyl-N-β-(β-methoxyethoxycarbonyl)-ethyl]aminoazobenzene | Yellow |
| 44 | 2-Methoxycarbonyl-4-nitro-2'-acetylamino-4-[N,N-di-(β-carbamoylethyl]aminoazobenzene | Red |
| 45 | 4-[Phthalid-6'-ylazo]-3-acetylamino-[N-(β-cyano-ethyl)-N-β-(β'-methoxyethoxycarbonyl)ethyl]aniline | Yellow |
| 46 | 1-(4'-methylsulphonyl)phenylazo-2-hydroxy-3-methoxy-carbonylnaphthalene | Orange |
| 47 | 1-Phenyl-3-ethoxycarbonyl-4-(4'-N-ethylsulphamoyl)-phenylazo-5-pyrazolone | Yellow |
| 48 | Ethyl α-[(4-ethylsulphonyl)phenylazo]-4-cyanoacetate | Greenish-yellow |
| 49 | 2,6-Di-(N-β-hydroxyethylamino)-3-cyano-4-methyl-5-(2'-methoxycarbonyl-4'-nitrophenylazo)pyridine | Orange |

Each of the disperse dyestuffs in the above Table, together with an appropriate reactive dyestuff or dyestuffs, may also be used to colour aromatic polyester/cellulose unions by the method described in Example 1, to give the shade indicated in the final column of the Table.

What we claim is:

1. A process for the continuous colouration of aromatic polyester or cellulose triacetate textile materials which comprises continuously applying to the said textile materials by an aqueous padding or printing process and fixing by a heat treatment a disperse azo dyestuff, free from carboxylic acid and sulphonic acid groups, which is represented by the formula:

$$A-N=N-E$$

wherein A is the residue of a diazotisable aromatic amine A—NH$_2$ and E is the residue of a coupling component which is an aromatic or heterocyclic amine, an aromatic hydroxy compound, a pyrazolone or an active aliphatic methylene compound, each dyestuff containing a single carboxylic ester group and at least one of the following:

(a) a primary, secondary or tertiary sulphamoyl group;
(b) a primary, secondary or tertiary carbamoyl group;
(c) an imido group;
(d) a hydroxy group;
(e) a sulphone group
(f) a lactone group; and subsequently giving the coloured textile material a treatment in an aqueous alkaline bath at a pH above 8 and at a temperature between 50° and 85° C. which does not contain a reducing agent.

2. A process as claimed in claim 1 wherein the disperse azo dyestuff contains, in addition to the single carboxylic acid ester group, a secondary sulphamoyl group, or a tertiary carbamoyl group, or a phthalimido group, or a cyano group and a sulphamoyl group, or a cyano group and a hydroxyl group.

3. A process as claimed in claim 1 wherein an aqueous dispersion of the disperse azo dyestuff is padded on to the textile material or a thickener printing paste is applied to the surface of the textile material, the dyestuff then being fixed on the textile material by steaming it at a temperature between 100° and 180° C. or baking it at a temperature between 160° and 220° C., the coloured textile material so obtained then being given a treatment in an aqueous alkaline bath which does not contain a reducing agent and having a temperature from 60° C. to 80° C. and a pH from 10.0 to 11.5.

4. A process for the continuous colouration of aromatic polyester/cellulose unions which comprises continuously applying to the said unions a nonreactive dyestuff or pigment for the cellulose and a disperse azo dyestuff as defined in claim 1 for the aromatic polyester, fixing the disperse dyestuff on the union and thereafter subjecting the coloured union to a treatment in an aqueous alkaline bath which does not contain a reducing agent at a pH above 8.0 and at a temperature between 50° and 85° C.

5. A process as claimed in claim 4 wherein the nonreactive dyestuff for cellulose is a Direct, Vat, Sulphur, Pigment or Azoic colouring matter.

6. A process as claimed in claim 4 wherein the treatment in the aqueous alkaline bath is carried out after both types of dyestuff have been fixed on the union.

7. A process for the continuous colouration of aromatic polyester/cellulose unions which comprises continuously applying to the said unions a reactive dyestuff for the cellulose and a disperse azo dyestuff as defined in claim 1 for the aromatic polyester, fixing the disperse dyestuff on the union and thereafter subjecting the coloured union to a treatment in an aqueous alkaline bath which does not contain a reducing agent at a pH above 8.0 and at a temperature between 50° and 85° C.

8. A process as claimed in claim 6 wherein the reactive dyestuff contains as the fibre-reactive group a heterocyclic ring having two or three nitrogen atoms in the ring and at least one labile substituent attached to a carbon atom of the heterocyclic ring.

9. A process as claimed in claim 7 wherein the reactive dyestuff contains a triazine or pyrimidine ring having as the labile substituent at least one chlorine, bromine or fluorine atom.

10. A process as claimed in claim 7 wherein the union is continuously padded or printed with a padding liquor or print paste containing the disperse dyestuff, a reactive dyestuff as defined in claim 8, and an alkaline agent, the padded or printed union then being subjected to a heat treatment to fix the deystuffs on the union, the coloured union then being given a treatment in an aqueous alkaline bath which does not contain a reducing agent at at pH above 8.0 and at a temperature between 50° and 85° C.

* * * * *